(12) United States Patent
Hershman

(10) Patent No.: US 11,799,627 B2
(45) Date of Patent: Oct. 24, 2023

(54) PROTECTION AGAINST SIDE-CHANNEL ATTACKS BY BALANCING CELL DRIVE POLARITY

(71) Applicant: NUVOTON TECHNOLOGY CORPORATION, Hsin-chu (TW)

(72) Inventor: Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 320 days.

(21) Appl. No.: 16/952,119

(22) Filed: Nov. 19, 2020

(65) Prior Publication Data
US 2022/0158817 A1    May 19, 2022

(51) Int. Cl.
H04L 9/00         (2022.01)
G06F 21/75        (2013.01)
H03K 19/00        (2006.01)

(52) U.S. Cl.
CPC ............ *H04L 9/003* (2013.01); *G06F 21/755* (2017.08); *H03K 19/0002* (2013.01);
(Continued)

(58) Field of Classification Search
CPC ... H04L 9/003; H04L 2209/12; G06F 21/755; G06F 2207/7266; H03K 19/0002; H03K 19/0005
See application file for complete search history.

(56) References Cited

U.S. PATENT DOCUMENTS

| | | | |
|---|---|---|---|
| 8,324,937 B2 | 12/2012 | Verbauwhede et al. | |
| 8,427,194 B2* | 4/2013 | Deas ..................... | G06F 21/755 326/8 |

(Continued)

FOREIGN PATENT DOCUMENTS

| | | |
|---|---|---|
| KR | 20110062961 A | 6/2011 |
| WO | 2005081085 A2 | 9/2005 |

OTHER PUBLICATIONS

Tiri, K. et al, "Securing Encryption Algorithms against DPA at the Logic Level: Next Generation Smart Card Technology" In: Walter, C.D., Koç, Ç.K., Paar, C. (eds) Cryptographic Hardware and Embedded Systems—CHES 2003, Lecture Notes in Computer Science, vol. 2779. Springer, Berlin, Heidlberg (Year: 2003).*

(Continued)

*Primary Examiner* — Daniel B Potratz
(74) *Attorney, Agent, or Firm* — KLIGLER & ASSOCIATES PATENT ATTORNEYS LTD

(57) ABSTRACT

An electronic circuit includes a driving cell, one or more driven cells and one or more inverters. The driving cell has two or more inputs and at least one output and is configured to toggle the output between first and second logic states in response to the inputs. Each driven cell has two or more inputs, of which at least one input is configured to be driven by the output of the driving cell. The one or more inverters are placed in a signal network that connects the driving cell to the driven cells. The inverters are configured to balance, over the signal network, (i) a first capacitive load charged by electrical currents caused by transitions from the first logic state to the second logic state and (ii) a second capacitive load charged by electrical currents caused by transitions from the second logic state to the first logic state.

19 Claims, 2 Drawing Sheets

(52) U.S. Cl.
CPC . *H03K 19/0005* (2013.01); *G06F 2207/7266* (2013.01); *H04L 2209/12* (2013.01)

(56) References Cited

U.S. PATENT DOCUMENTS

| | | | |
|---|---|---|---|
| 10,521,530 B2 | 12/2019 | Levi et al. | |
| 10,691,836 B2* | 6/2020 | Kose | G06F 21/755 |
| 11,283,349 B2* | 3/2022 | Kudva | H02M 3/155 |
| 2015/0130505 A1* | 5/2015 | Yannette | H04L 9/002 |
| | | | 326/8 |
| 2015/0169904 A1* | 6/2015 | Leiserson | G06F 21/755 |
| | | | 713/189 |

OTHER PUBLICATIONS

Tiri, K. et al, "Securing Encryption Algorithms against DPA at the Logic Level: Next Generation Smart Card Technology" In: Walter, C.D., Koç, Ç.K., Paar, C. (eds) Cryptographic Hardware and Embedded Systems—CHES 2003, Lecture Notes in Computer Science, vol. 2779., pp. 125-136 (Year: 2003).*

Bucci, M., et al, "Three-Phase Dual-Rail Pre-charge Logic", In: Goubin, L., Matsui, M. (eds) Cryptographic Hardware and Embedded Systems—CHES 2006, Lecture Notes in Computer Science, vol. 4249. Springer, Berlin, Heidelberg, pp. 232-241. (Year: 2006).*

Bystrov, A. et al, "Balancing Power Signature in Secure Systems", in Proc. 14th UK Asynchronous Forum, 2003. pp. 1-6 (Year: 2003).*

Tokunaga, C. et al, "Securing Encryption Systems With a Switched Capacitor Current Equalizer", IEEE Journal of Solid-State Circuits, vol. 45, No. 1, Jan. 2010 (Year: 2010).*

Hershman, U.S. Appl. No. 16/741,779, filed Jan. 14, 2020.

Hershman, U.S. Appl. No. 16/194,342, filed Nov. 18, 2018.

Baddam, "Hardware Level Countermeasures Against Differential Power Analysis," Ph.D. thesis, University of Southampton, Faculty of Physical and Applied Sciences, School of Electronics and Computer Science, pp. 1-388, Feb. 2012.

Tiri et al., "A Dynamic and Differential CMOS Logic with Signal Independent Power Consumption to Withstand Differential Power Analysis on Smart Cards," Proceedings of the 28th European Solid-State Circuits Conference, pp. 1-4, Oct. 2002.

* cited by examiner

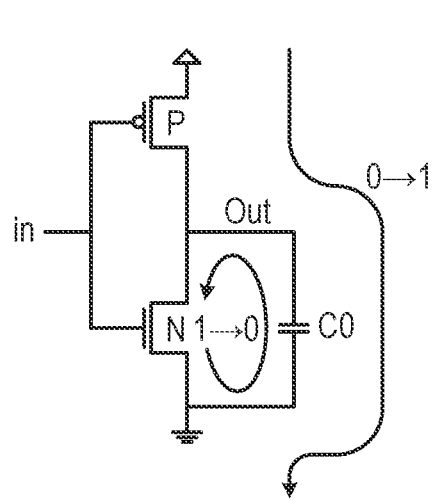
FIG. 5A
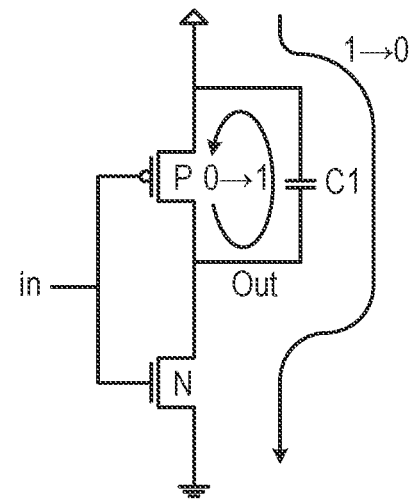
FIG. 5B
FIG. 6
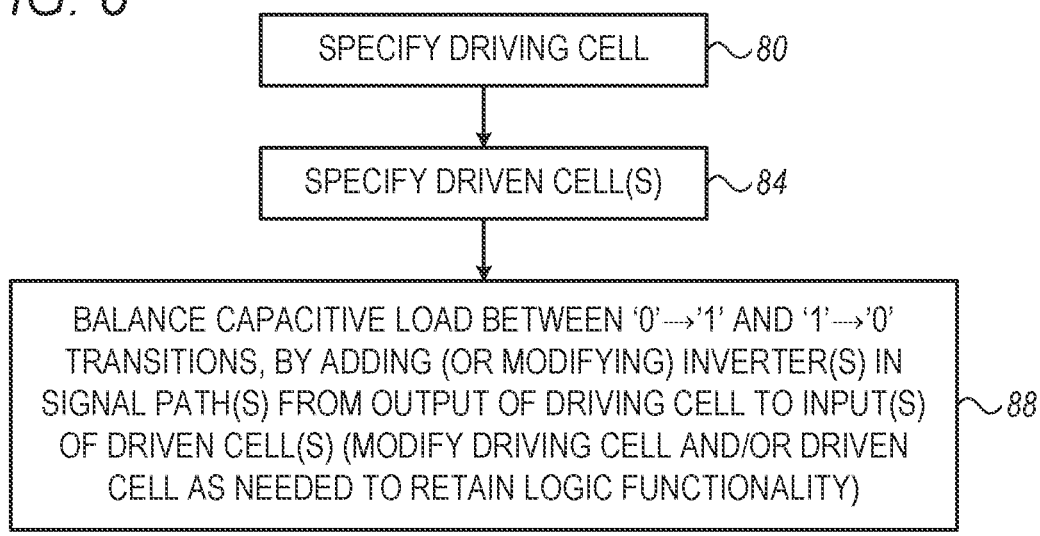

PROTECTION AGAINST SIDE-CHANNEL ATTACKS BY BALANCING CELL DRIVE POLARITY

FIELD OF THE INVENTION

The present invention relates generally to data security in electronic circuitry, and particularly to methods and systems for protecting against side-channel attacks.

BACKGROUND OF THE INVENTION

Various techniques, referred to as side-channel attacks, have been developed for extracting information from electronic devices. Side-channel attacks are typically performed by unauthorized parties in order to access secret information stored within the devices. Some side-channel attacks take advantage of the fact that electronic devices typically consume power during transitions of logic elements. The attacks extract information by non-invasively measuring electrical signals and/or electromagnetic radiation emitted from the devices, without electrically contacting the devices that carry the information.

Various countermeasures have been proposed for protecting electronic devices against side-channel attacks. For example, Baddam describes several types of countermeasures, and in particular Dual Rail Precharge (DRP) circuits, in a PhD Thesis entitled "Hardware Level Countermeasures Against Differential Power Analysis," University of Southampton, Faculty of Physical and Applied Sciences, School of Electronics and Computer Science, February, 2012.

U.S. Pat. No. 10,521,530 describes a method of designing a logic circuit with data-dependent delays using an electronic design automation system, for mitigating power analysis attacks. The logic circuit includes logic paths from logic inputs to at least one logic output. The method includes obtaining an initial circuit design, specifying respective delays for multiple logic paths in the initial circuit design such that at least some of the outputs switch at different times within a clock cycle for different combinations of logic input levels, and forming a second circuit design having the specified respective delays along the respective logic paths by adding delay elements to the initial circuit design based on the specified respective delays.

SUMMARY OF THE INVENTION

An embodiment of the present invention that is described herein provides an electronic circuit including a driving cell, one or more driven cells and one or more inverters. The driving cell has two or more inputs and at least one output and is configured to toggle the output between first and second logic states in response to the inputs. Each driven cell has two or more inputs, of which at least one input is configured to be driven by the output of the driving cell. The one or more inverters are placed in a signal network that connects the driving cell to the driven cells. The inverters are configured to balance, over the signal network, (i) a first capacitive load charged by electrical currents caused by transitions from the first logic state to the second logic state and (ii) a second capacitive load charged by electrical currents caused by transitions from the second logic state to the first logic state.

Typically, by balancing the first and second capacitive loads, the inverters are configured to balance (i) a first electrical current consumed in the signal network in response to the driving cell transitioning from the first logic state to the second logic state, and (ii) a second electrical current consumed in the signal network in response to the driving cell transitioning from the second logic state to the first logic state.

In some embodiments, at least one of the first and second capacitive loads is between the signal network and ground. In some embodiments, at least one of the first and second capacitive loads is between the signal network and a supply voltage rail of the electronic circuit.

in an embodiment, the one or more driven cells consist of a single driven cell, the signal network includes a conductor routed between the output of the driving cell and the at least one input of the driven cell, and the one or more inverters are placed along the conductor. In another embodiment, the one or more driven cells include multiple driven cells, the signal network includes a split followed by multiple conductors routed to respective inputs of the driven cells, and the one or more inverters include multiple inverters placed between the split and the inputs of the driven cells. In yet another embodiment, the one or more driven cells include multiple driven cells, the signal network includes a split followed by multiple conductors routed to respective inputs of the driven cells, and the one or more inverters include an inverter placed between the output of the driving cell and the split.

There is additionally provided, in accordance with an embodiment of the present invention, a method for designing an electronic circuit. The method includes specifying a driving cell, which includes two or more inputs and at least one output and is configured to toggle the output between first and second logic states in response to the inputs. One or more driven cells are specified, each driven cell including two or more inputs, of which at least one input is configured to be driven by the output of the driving cell. One or more inverters are placed in a signal network that connects the driving cell to the driven cells, the inverters configured to balance, over the signal network, (i) a first capacitive load charged by electrical currents caused by transitions from the first logic state to the second logic state and (ii) a second capacitive load charged by electrical currents caused by transitions from the second logic state to the first logic state.

In an embodiment, placing the one or more inverters includes adding an odd number of inverters in a given path between the driving cell and a driven cell, and embedding an additional inversion in either the driving cell or the driven cell.

There is also provided, in accordance with an embodiment of the present invention, a method for data processing in an electronic circuit. The method includes, using a driving cell, which includes two or more inputs and at least one output, toggling the output between first and second logic states in response to the inputs. One or more driven cells are driven by the output of the driving cell, each driven cell including two or more inputs, of which at least one input is configured to be driven by the output of the driving cell. Using one or more inverters, which are placed in a signal network that connects the driving cell to the driven cells, a balance is made over the signal network between (i) a first capacitive load charged by electrical currents caused by transitions from the first logic state to the second logic state and (ii) a second capacitive load charged by electrical currents caused by transitions from the second logic state to the first logic state.

The present invention will be more fully understood from the following detailed description of the embodiments thereof, taken together with the drawings in which:

BRIEF DESCRIPTION OF THE DRAWINGS

FIGS. 5A and 5B are circuit diagrams that schematically illustrate '0'-to-'1' and '1'-to-'0' state transitions in an inverter, in accordance with an embodiment of the present invention; and FIG. 6 is a flow chart that schematically illustrates a method for designing a secure electronic circuit, in accordance with an embodiment of the present invention.

DETAILED DESCRIPTION OF EMBODIMENTS

Overview

Figure 1:
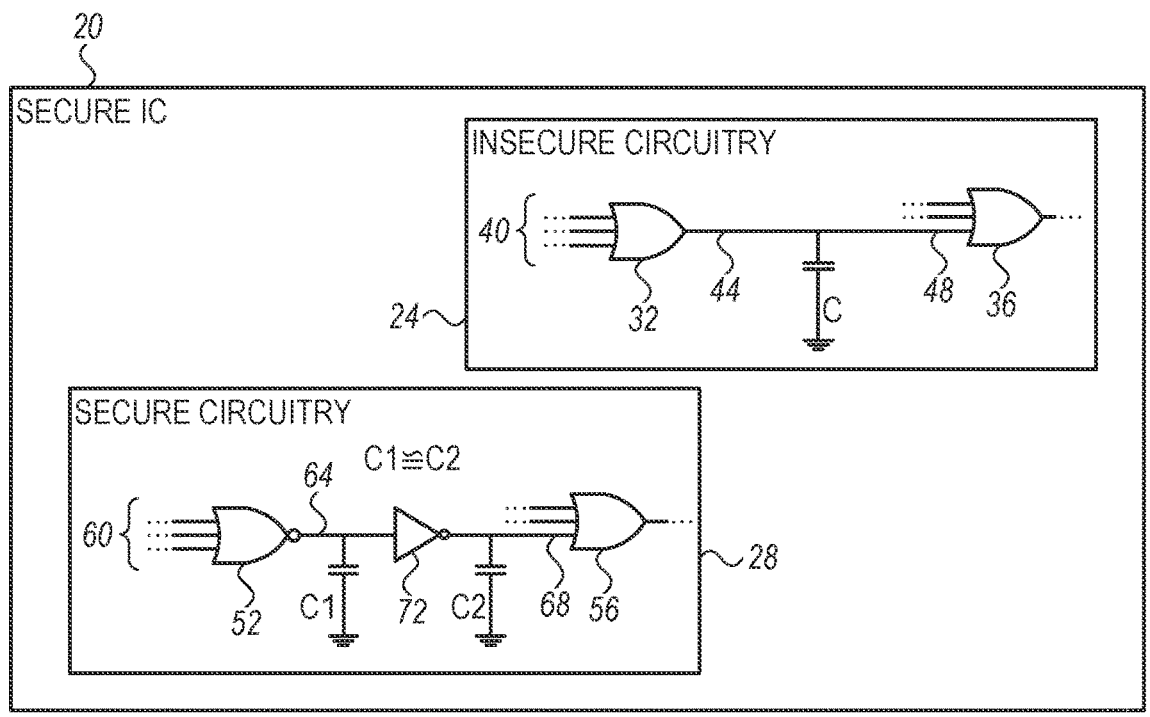
FIG. 1 is a block diagram that schematically illustrates an Integrated Circuit (IC) comprising secure circuitry and insecure circuitry, in accordance with an embodiment of the present invention.

Embodiments of the present invention that are described herein provide improved methods and circuitry for protecting electronic circuits against side-channel attacks. The disclosed techniques can be used in various types of secure devices, such as secure embedded controllers and memory devices.

In some embodiments, an electronic circuit comprises multiple logic cells, each comprising one or more inputs and one or more outputs. Each output is connected to one or more inputs of one or more other logic cells by electrical conductors, e.g., circuit traces. In each clock cycle, some of the logic cells may transition their outputs from one logic state to another ('0'-to-'1' or '1'-to-'0') in response to transitions on one or more of their inputs. Unless mitigated, the sequence of state transitions of the logic cells may cause variations in the current consumption of the circuit as a whole, which can be measured by and assist an attacker.

One of the main causes of such variations in current consumption is the capacitive load being charged during state transitions. The capacitive load typically comprises the capacitance between circuit conductors and ground, the capacitance between circuit conductors and the supply voltage (Vdd), the capacitance between circuit conductors (capacitance to other signal lines), and/or the capacitance of the logic cells themselves.

Consider a complex logic cell (i.e., a logic cell which has multiple inputs and which performs some logic operation to produce an output) whose output drives inputs of one or more other complex logic cells. The former logic cell will be referred to herein as a "driving cell," and the latter logic cells will be referred to as "driven cells." The path that connects the output of the (complex) driving cell to the input(s) of the (complex) driven cell(s) will be referred to herein as a "signal network."

The signal network that connects a driving cell to one or more driven cell(s) has a certain capacitance to ground (or, more generally, a certain capacitance to ground and another capacitance to other voltage sources like the supply voltage rail or other signals). When the output of the driving cell transitions from one logic state to another, the voltage transition on the output of the driving cell causes electrical current to flow and charge these capacitances. The resulting current contributes to the total instantaneous current consumption of the circuit.

Generally, however, the current consumption caused by a '0'-to-'1' transition of the output of the driving cell may differ from the current consumption caused by a '1'-to-'0' transition. When '0'-to-'1' transitions differ in current consumption from '1'-to-'0' transitions, the instantaneous current consumption of the circuit may be indicative of internal operations that may involve sensitive information. This imbalance poses a security vulnerability that may be exploited by power analysis attacks.

Embodiments of the present invention that are described herein provide circuit configurations and associated design methods for reducing the impact of state transitions on the circuit current consumption. In the disclosed embodiments, one or more additional inverters are added in the signal network between a driving cell and its driven cell(s). The inverters are added in a way that balances the capacitive load being charged due to '0'-to-'1' transitions and the capacitive load being charged due to '1'-to-'0' transitions of the driving cell's output. If necessary, the logic of the driving cell and/or the driven cell(s) may be modified, so that the additional inverter(s) will not change the logic functionality of the circuit.

The disclosed technique can be used for balancing the capacitive loads across an entire circuit, or over a selected portion of the circuit that manipulates sensitive information. In this manner, the circuit's instantaneous current consumption can be made substantially independent of the sensitive information being processed. The disclosed technique therefore reduces the circuit's sensitivity to power analysis attacks. Several example circuit configurations that use the disclosed technique are described herein. Example design techniques, for causing a design tool to balance capacitive loads by inserting inverters, are also described.

One alternative way to reduce a circuit's sensitivity to power analysis attacks is to apply techniques known as Dual-rail Pre-charge Logic (DPL). In DPL, a circuit is protected by a complementary circuit operating in parallel. Every net of the protected circuit has a corresponding net in the complementary circuit that undergoes an opposite state transition. As a result, in every clock cycle the overall number of '0'-to-'1' transitions is equal to the overall number '1'-to-'0' transitions, regardless of the data values being processed. This result, however, comes at the price of doubling the hardware, and therefore doubling the cost, size and power consumption of the circuit. The disclosed techniques are considerably simpler to implement than DPL and requires considerably less than doubling of hardware.

In some embodiments, the disclosed technique can be used for implementing secure circuitry such as cryptographic engines, e.g., AES engines, in conjunction with other techniques that mitigate power analysis attacks. Example techniques are described, for example, in U.S. patent application Ser. No. 16/741,779, entitled "Coupling of Combinational Logic Circuits for Protection against Side-Channel Attacks," and in U.S. patent application Ser. No. 16/194,342, entitled "Mitigation of Side-Channel Attacks using Small-Overhead Random Pre-Charging." Both these patent applications are assigned to the assignee of the present patent applications, and their disclosures are incorporated herein by reference.

System Description

FIG. 1 is a block diagram that schematically illustrates a secure Integrated Circuit (IC) 20 protected against side-channel attacks, in accordance with an embodiment of the present invention. Secure IC 20 may comprise, for example, a memory device with integrated encryption circuitry, an Embedded Controller (EC) or Baseboard Management Controller (BMC) that comprises encryption or authentication circuitry, or any other suitable secure electronic device.

In the present example, although not necessarily, IC 20 comprises both insecure circuitry 24 and secure circuitry 28. Secure circuitry 28 may comprise, for example, a cryptographic engine or any other circuitry that should be protected against side-channel attacks. Insecure circuitry 24 may comprise any circuitry in which protection is less significant.

In the present example, insecure circuitry 24 comprises a driving cell 32 and a driven cell 36. For the sake of clarity, FIG. 1 depicts only a single driving cell, a single driven cell, and the signal network between them. In practice, circuitry 24 typically comprises a large number of cells that together implement a logic function, such as a multiplier, an AES S-box or any other suitable logic function.

Driving cell 32 and driven cell 36 are both complex logic cells, i.e., each has multiple inputs (as opposed, for example, to buffers and inverters). Driving cell 32 comprises multiple inputs 40 and an output 44. Driven cell 36 comprises multiple inputs, of which one input 48 is driven by output 44 of driving cell 32. The signal network between driving cell 32 and driven cell 36 comprises a circuit trace, whose capacitance to ground is denoted C.

Capacitance C of the signal network acts as a capacitive load for output 44 of driving cell 32. In this example, there is no balance between the capacitance being charged during '0'-to-'1' transition of output 44, and the capacitance being charged during '0'-to-'1' transition of output 44. Therefore, '0'-to-'1' transitions and '0'-to-'1' transitions of output 44 will generally differ in current consumption.

Secure circuitry 28 in the example of FIG. 1 comprises a driving cell 52 and a driven cell 56. Here, too, for the sake of clarity the figure shows only a single driving cell, a single driven cell, and the signal network between them. In practice circuitry 28 typically comprises a large number of cells that drive one another.

Driving cell 52 comprises multiple inputs 60 and an output 64. Driven cell 56 comprises multiple inputs, of which one input 68 is driven by output 64 of driving cell 52. In order to avoid the imbalance in capacitive load, an additional inverter 72 is placed in the network between output 64 and input 68. When placed properly, the portion of the capacitance of the signal network preceding inverter 72 (denoted C1) is equal to the portion of the capacitance of the signal network following inverter 72 (denoted C2).

Placing inverter 72 in this manner balances the current consumed due to '0'-to-'1' transitions of output 64, and the current consumed due to '1'-to-'0' transitions of output 64.

Consider a '0'-to-'1' transition of output 64. In this transition, the voltage on output 64 transitions from the voltage representing logic '0' to the voltage representing logic '1'. This voltage transition causes a certain current to flow via capacitance C1. This current is denoted i('0'-to-'1', C1), and is a function of the voltages representing '0' and '1', and of the capacitance C1. The '0'-to-'1' transition of output 64 causes an opposite transition, i.e., '1'-to-'0', on the output of inverter 72. The voltage at the output of inverter 72 thus transitions from the voltage representing logic '1' to the voltage representing logic '0'. This voltage transition causes a certain current to flow via capacitance C2. This current is denoted i('1'-to-'0', C2), and is a function of the voltages representing '0' and '1', and of the capacitance C2.

Now consider an opposite transition of output 64, from '1' to '0'. In this transition, the voltage on output 64 transitions from the voltage representing logic '1' to the voltage representing logic '0'. This voltage transition causes a certain current to flow via capacitance C1. This current is denoted i('1'-to-'0', C1), and is a function of the voltages representing '0' and '1', and of the capacitance C1. The '1'-to-'0' transition of output 64 causes an opposite transition, i.e., '0'-to-'1', on the output of inverter 72. The voltage at the output of inverter 72 thus transitions from the voltage representing logic '0' to the voltage representing logic '1'. This voltage transition causes a certain current to flow via capacitance C2. This current is denoted i('0'-to-'1', C2), and is a function of the voltages representing '0' and '1', and of the capacitance C2.

The total current consumed in the signal network during '0'-to-'1' transition of output 64 is given by i('0'-to-'1')=i('0'-to-'1', C1)+i('1'-to-'0', C2), and the total current consumed in the signal network during '1'-to-'0' transition of output 64 is given by i('1'-to-'0')=i('1'-to-'0', C1)+i('0'-to-'1', C2). As can be seen, if C1=C2, then i('0'-to-'1')=i('1'-to-'0'). Thus, when the capacitive load is balanced by inverter 72, the current consumed by the signal network is independent of the direction of the state transition (i.e., independent of whether output 64 transitions from '1'-to-'0' or from '0'-to-'1').

In the above description, perfect balancing of current consumption was shown to be achieved by perfect balancing of the capacitive load. As can be appreciated, in practical implementations some residual difference may remain between the capacitances C1 and C2. Nevertheless, this residual difference is typically sufficiently small, so as to enable effective mitigation of power analysis attacks on secure circuitry 28, possibly in conjunction with other countermeasures. In the context of the present patent application and in the claims, terms such as "balanced capacitance," "balanced capacitive load" and "balanced current consumption" mean that the residual difference in capacitance, capacitive load or current consumption is below a predefined threshold that is deemed sufficient for effective mitigation of attack.

Alternative Network Designs Having Balanced Capacitive Loads

Figure 2:
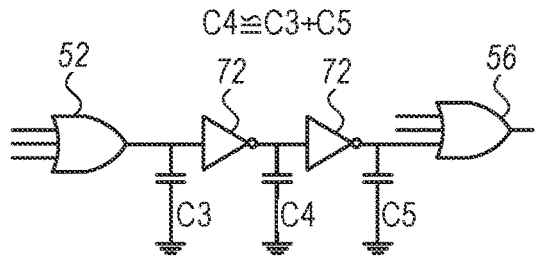
FIGS. 2-4 are block diagrams that schematically illustrate electronic circuits having balanced capacitive loads, in accordance with embodiments of the present invention.
Figure 3:
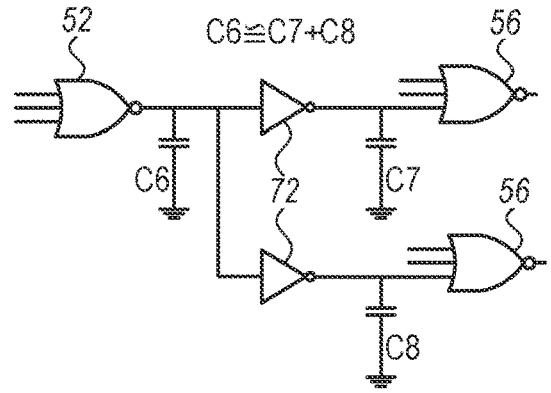
Figure 4:
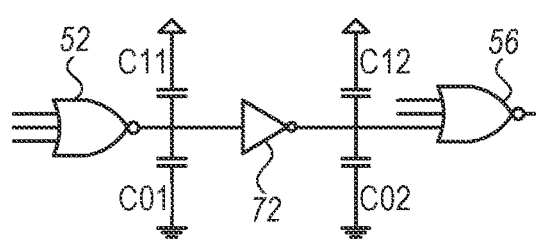

FIGS. 2-4 are block diagrams that schematically illustrate electronic circuits having balanced capacitive loads, in accordance with alternative embodiments of the present invention.

In FIG. 2, two inverters 72 are placed in the signal network between the output of driving cell 52 and the input of driven cell 56. In this implementation, upon a state transition on the output of driving cell 52, the capacitances denoted C3 and C5 are driven in one direction ('0'-to-'1' or '1'-to-'0') and the capacitance denoted C4 is driven in the opposite direction ('1'-to-'0' or '0'-to-'1', respectively). Therefore, to achieve balance in capacitive load, the capacitances should meet the condition C4=C3+C5.

FIG. 3 illustrates a case in which the output of driving cell 52 is split and used for driving inputs of two driven cells 56 in parallel. In this example, the capacitance of the signal network before the split is denoted C6, and the capacitances of the two branches after the split are denoted C7 and C8. Two inverters 72 are placed in the signal network, adjacently to the split, between the split and the inputs of the driven cells. In this case, to achieve balance in capacitive load, the capacitances should meet the condition C6=C7+C8. In an alternative embodiment, instead of the two inverters shown in the figure, a single inverter may be placed before the split (between the output of the driving cell and the split, following C6, adjacently to the split).

FIG. 4 illustrates a case in which the signal network has capacitance both to ground and to the voltage rail Vdd. One inverter 72 is placed in the signal network. The capacitances of the section preceding the inverter are denoted C01 (to ground) and C11 (to Vdd). The capacitances of the section following the inverter are denoted C02 (to ground) and C12 (to Vdd). In this case, to achieve balance in capacitive load, the capacitances should meet the condition C11+C02=C01+C12.

FIGS. 5A and 5B are circuit diagrams that schematically illustrate logic state transitions in inverter 72, in accordance with an embodiment of the present invention. In the present example, inverter 72 comprises a P-type Metal-Oxide-Semiconductor Field Effect Transistor (PMOS FET) denoted "P" and an N-type Metal-Oxide-Semiconductor Field Effect Transistor (NMOS FET) denoted "N", which are connected source-to-drain between Vdd and ground. The input of inverter 72 is applied to the gates of both transistors. The output of inverter 72 is taken from the connection point between the source of the P transistor and the drain of the N transistor.

FIG. 5A illustrates the case of a capacitive load (denoted C0) between the output and ground. FIG. 5B illustrates the case of a capacitive load (denoted C1) between the output and the supply voltage (Vdd). In both figures, an arrow marked "0⇒1" illustrates the current flow during a '0'-to-'1' transition of the output, and an arrow marked "1⇒0" illustrates the current flow during a '0'-to-'1' transition of the output. Most practical scenarios comprise a superposition of the two cases.

As can be seen in FIGS. 5A and 5B, the current consumption is not symmetrical. For example, in FIG. 5A, current flows from Vdd to ground only during '0'-to-'1' transitions. During '1'-to-'0' transitions, the current roughly flows from one capacitor pole to the other, and does not necessarily reach ground. Setting the capacitances so as to meet the condition in FIG. 4 above balances the current consumption of '0'-to-'1' transitions and '1'-to-'0' transitions.

The configurations of the various electronic circuits shown in FIGS. 1-4, 5A and 5B are example configurations that are depicted purely for the sake of conceptual clarity. In alternative embodiments, any other suitable circuit configurations can be used. For example, any suitable combination of the configurations of FIGS. 1-4 can be used.

As another example, in the above examples the driving cells and the driven cells are three-input OR or NOR cells. This choice, however, is made purely by way of example. In alternative embodiments, any of the driving cells and the driven cells may comprise any other suitable logic cell having two or more inputs and one more outputs, e.g., various OR, AND, NOR, NAND and XOR gates.

As yet another example, the number of inverters 72 placed between a given driving cell and a given driven cell is not limited to one or two, and may comprise any suitable number. As another example, the output of the driving cell may be split into more than two branches for driving more than two driven cells. In general, driven cells may differ from one another, and/or from the driving cell, as appropriate for performing the desired logic functionality of the circuit.

In various embodiments, any of the disclosed circuits may be implemented using any suitable hardware or firmware, such as using one or more discrete components, one or more Application-Specific Integrated Circuits (ASICs) and/or one or more Field-Programmable Gate Arrays (FPGAs).

Design Methods for Achieving Balanced Capacitive Loads

In some embodiments, secure circuits in accordance with embodiments of the present invention, such as the examples shown in FIGS. 1-4, can be designed using existing Very Large Scale Integration (VLSI) design tools and processes. Example guidelines for the design may comprise the following:

- Induce the synthesis process to use small-size logic cells, e.g., use a NOR cell followed by an inverter instead of an OR cell.
- Restrict the maximal transition time, so as to induce insertion of inverters.
- Avoid using buffers, and use inverters instead (or replace already existing buffers with inverter pairs).
- Use cells with low drive-strength, so as to induce insertion of inverters.
- Induce the synthesis to avoid using cells with an extra inverter on their output stage (like AND, OR and Buffer), and instead use the corresponding simpler version (like NAND, NOR, Inverter). This will force the synthesis to complement the logic with external inverter which can later be used to balance the capacitance.
- A pair of inverters, connected in series, can be explicitly added on nets which needs protection if no inverters exist between the driving cell and the driven cell.
- Balance the locations of the inverters as part of the backend stage of the design.

FIG. 6 is a flow chart that schematically illustrates a method for designing a secure electronic circuit, in accordance with an embodiment of the present invention. The method begins with the designer or design tool specifying a driving cell, at a driving cell specification step 80. At a driven cell specification step 84, the designer or design tool specifies one or more driven cells that are driven by the driving cell.

At a balancing step 88, the designer or design tool adds or modifies one or more inverters in the signal network between the driving cell and the driven cell(s), as explained herein. Adding or modifying inverters can be performed in various ways. For example, in some cases it is sufficient to modify existing inverters, e.g., resize one or more existing inverters or change the location of one or more existing inverters in the network. As another example, an inverter can be added by replacing an existing logic gate with another, e.g., replacing an OR gate with a NOR gate or vice versa, or replacing an AND gate with a NAND gate or vice versa. As yet another example, an additional inversion can be embedded at the input of the driven cell, thereby warranting insertion of only one inverter.

Note that, generally, if an odd number of inverters is added on a path between a driving cell and a driven cell, either the driving cell or the driven cell should be modified to maintain the correct functionality of the circuit. The modification typically comprises embedding an extra inversion at the output of the driving cell, or at the input of the driven cell.

The process of FIG. 6 may be applied across an entire electronic circuit, e.g., an IC, or over a portion of the circuit that requires extra protection.

In some embodiments, the disclosed design techniques, e.g., the method of FIG. 6, can be carried out by a generalpurpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Although the embodiments described herein mainly address balancing capacitive load during state transitions, the methods and systems described herein can also be used in other applications, such as in balancing the capacitive load while the data does not change ("data at rest"). In such an application, the parameter to be balanced is the leakage current at logic '0' vs. the leakage current at logic '1'.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic circuit, comprising:
a driving logic gate, which comprises two or more inputs and a single output and is configured to toggle the single output between first and second logic states in response to the inputs;
one or more driven logic gates, each driven logic gate comprising two or more inputs, of which at least one input is configured to be driven by the single output of the driving logic gate; and
one or more inverters, which are placed in a signal network that connects the single output of the driving logic gate to one or more of the inputs of the one or more driven logic gates, the inverters configured to equalize, over the signal network, (i) a first capacitive load charged by first electrical currents caused by first transitions from the first logic state to the second logic state and (ii) a second capacitive load charged by second electrical currents caused by second transitions from the second logic state to the first logic state, the first transitions being opposite to the second transitions, both the first transitions and the second transitions occurring between the single output of the driving logic gate and the one or more of the inputs of the one or more driven logic gates.

2. The electronic circuit according to claim 1, wherein, by equalizing the first and second capacitive loads, the inverters are configured to balance (i) a first electrical current consumed in the signal network in response to the driving logic gate transitioning from the first logic state to the second logic state, and (ii) a second electrical current consumed in the signal network in response to the driving logic gate transitioning from the second logic state to the first logic state.

3. The electronic circuit according to claim 1, wherein at least one of the first and second capacitive loads is between the signal network and ground.

4. The electronic circuit according to claim 1, wherein at least one of the first and second capacitive loads is between the signal network and a supply voltage rail of the electronic circuit.

5. The electronic circuit according to claim 1, wherein the one or more driven logic gates consist of a single driven logic gate, wherein the signal network comprises a conductor routed between the single output of the driving logic gate and the at least one input of the driven logic gate, and wherein the one or more inverters are placed along the conductor.

6. The electronic circuit according to claim 1, wherein the one or more driven logic gates comprise multiple driven logic gates, wherein the signal network comprises a split followed by multiple conductors routed to respective inputs of the driven logic gates, and wherein the one or more inverters comprise multiple inverters placed between the split and the inputs of the driven logic gates.

7. The electronic circuit according to claim 1, wherein the one or more driven logic gates comprise multiple driven logic gates, wherein the signal network comprises a split followed by multiple conductors routed to respective inputs of the driven logic gates, and wherein the one or more inverters comprise an inverter placed between the single output of the driving logic gate and the split.

8. A method for designing an electronic circuit, the method comprising:
specifying a driving logic gate, which comprises two or more inputs and a single output and is configured to toggle the single output between first and second logic states in response to the inputs;
specifying one or more driven logic gates, each driven logic gate comprising two or more inputs, of which at least one input is configured to be driven by the single output of the driving logic gate; and
placing one or more inverters in a signal network that connects the single output of the driving logic gate to one or more of the inputs of the one or more driven logic gates, the inverters configured to equalize, over the signal network, (i) a first capacitive load charged by electrical currents caused by transitions from the first logic state to the second logic state and (ii) a second capacitive load charged by electrical currents caused by transitions from the second logic state to the first logic state, the first transitions being opposite to the second transitions, both the first transitions and the second transitions occurring between the single output of the driving logic gate and the one or more of the inputs of the one or more driven logic gates.

9. The method according to claim 8, wherein placing the one or more inverters comprises balancing (i) a first electrical current consumed in the signal network in response to the driving logic gate transitioning from the first logic state to the second logic state, and (ii) a second electrical current consumed in the signal network in response to the driving logic gate transitioning from the second logic state to the first logic state.

10. The method according to claim 8, wherein at least one of the first and second capacitive loads is between the signal network and ground.

11. The method according to claim 8, wherein at least one of the first and second capacitive loads is between the signal network and a supply voltage rail of the electronic circuit.

12. The method according to claim 8, wherein the one or more driven logic gates consist of a single driven logic gate, wherein the signal network comprises a conductor routed between the single output of the driving logic gate and the at least one input of the driven logic gate, and wherein placing the one or more inverters comprises placing the one or more inverters along the conductor.

13. The method according to claim 8, wherein the one or more driven logic gates comprise multiple driven logic gates, wherein the signal network comprises a split followed by multiple conductors routed to respective inputs of the driven logic gates, and wherein placing the one or more inverters comprises placing multiple inverters between the split and the inputs of the driven logic gates.

14. The method according to claim 8, wherein the one or more driven logic gates comprise multiple driven logic gates, wherein the signal network comprises a split followed by multiple conductors routed to respective inputs of the driven logic gates, and wherein placing the one or more inverters comprises placing an inverter between the single output of the driving logic gate and the split.

15. The method according to claim 8, wherein placing the one or more inverters comprises adding an odd number of inverters in a given path between the driving logic gate and a driven logic gate, and embedding an additional inversion in either the driving logic gate or the driven logic gate.

16. A method for data processing in an electronic circuit, the method comprising:
   using a driving logic gate, which comprises two or more inputs and a single output, toggling the single output between first and second logic states in response to the inputs;
   driving, by the single output of the driving logic gate, one or more driven logic gates, each driven logic gate comprising two or more inputs, of which at least one input is configured to be driven by the single output of the driving logic gate; and
   using one or more inverters, which are placed in a signal network that connects the single output of the driving logic gate to one or more of the inputs of the one or more driven logic gates, equalizing over the signal network (i) a first capacitive load charged by electrical currents caused by transitions from the first logic state to the second logic state and (ii) a second capacitive load charged by electrical currents caused by transitions from the second logic state to the first logic state, the first transitions being opposite to the second transitions, both the first transitions and the second transitions occurring between the single output of the driving logic gate and the one or more of the inputs of the one or more driven logic gates.

17. The method according to claim 16, wherein equalizing the capacitive load comprises balancing (i) a first electrical current consumed in the signal network in response to the driving logic gate transitioning from the first logic state to the second logic state, and (ii) a second electrical current consumed in the signal network in response to the driving logic gate transitioning from the second logic state to the first logic state.

18. The method according to claim 16, wherein at least one of the first and second capacitive loads is between the signal network and ground.

19. The method according to claim 16, wherein at least one of the first and second capacitive loads is between the signal network and a supply voltage rail of the electronic circuit.

\* \* \* \* \*